Dec. 6, 1960   A. AFRICANO ET AL   2,962,858
FUEL INJECTION APPARATUS
Filed Nov. 23, 1956
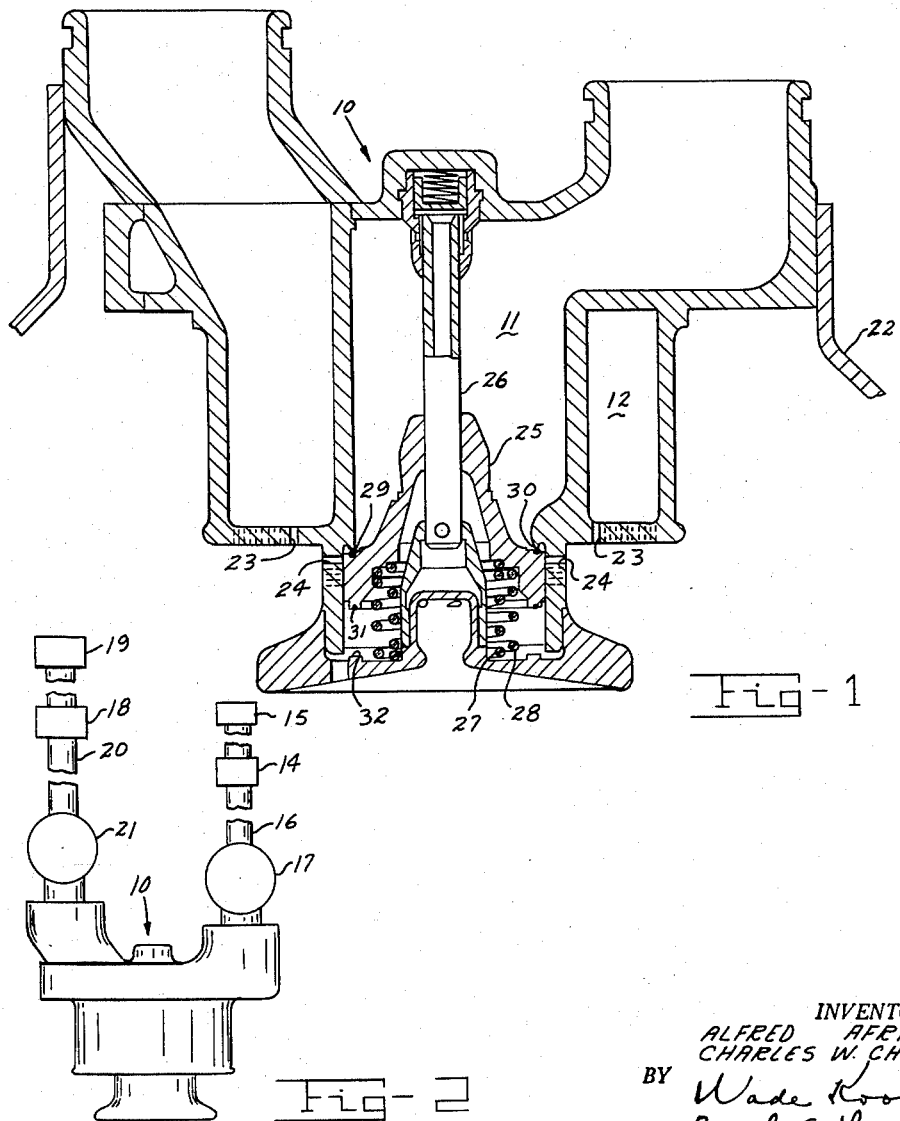
INVENTORS
ALFRED AFRICANO
CHARLES W. CHILLSON
BY Wade Koontz
Frank C. Leach Jr.
ATTORNEYS

:::::::::::::::::::::::::::::::::::::::::::::::::::::::::::::::::::::::

2,962,858

Patented Dec. 6, 1960

---

2,962,858

FUEL INJECTION APPARATUS

Alfred Africano, Birmingham, Mich., and Charles W. Chillson, Packanack Lake, N.J., assignors to the United States of America as represented by the Secretary of the Air Force Filed Nov. 23, 1956, Ser. No. 624,180

2 Claims. (Cl. 60—35.6)

This invention relates to a fuel injection apparatus and, more particularly, to an apparatus for feeding liquid combustion propellants to a chamber in which combustion is to be maintained.

After a flame has been established in the combustion chamber of a rocket engine, for example, in which liquid propellants are burned, the combustion process is continued by mixing of the liquid combustion propellants in the combustion chamber. Since spontaneous combustion occurs upon mixing of the liquid propellants, it is desirable to mix the combustion elements as thoroughly as possible in the combustion chamber to produce the highest combustion efficiency. Similarly, it is desirable to prevent any of the liquid fuel from dripping into the combustion chamber during shutdown since an accumulation of fuel in the chamber during nonoperating periods of the engine could result in an explosion when the engine started again.

An object of this invention is to provide a fuel injector for a rocket engine that insures effective mixing of the two fluids passing through the injector.

Another object of this invention is to provide a fuel injector for a rocket engine that stops the flow of fuel into the combustion chamber on shutdown.

Other objects of this invention will be readily perceived from the following description.

This invention relates to injection apparatus for supplying fluids to a chamber or the like. The apparatus comprises two fluid chambers having fluid supplied to each by suitable means. The flow of fluids from the two chambers is directed in streams at substantially right angles to each other. Means control the flow of fluid from one of the fluid chambers.

The attached drawing illustrates a preferred embodiment of the invention, in which:

Fig. 1 is a sectional view of the fuel injection apparatus of the present invention; and Fig. 2 is a schematic view of a fluid system including the present invention.

Referring to the drawing and particularly Fig. 1, there is shown a housing or casing 10 having an inner annular fluid chamber 11 and an outer annular fluid chamber 12 surrounding the inner chamber. While any two fluids might be supplied to the housing 10, liquid fuel such as water alcohol, for example, is supplied to the chamber 11 while liquid oxygen is supplied to the chamber 12 in the present embodiment. A fuel pump 14 supplies the liquid fuel to the chamber 11 from a tank 15 through a conduit 16. The flow of fuel from the pump 14 to the inner chamber 11 is controlled by a valve 17 in the conduit 16.

A second pump 18 supplies liquid oxygen to the outer chamber 12 from a tank 19 through a conduit 20. A valve 21 in the conduit 20 controls the flow of liquid oxygen to the outer chamber 12. Since the details of the fluid system do not form a part of the present invention, they are not shown and described in this application but are described in detail in the copending application of Charles W. Chillson et al., Serial No. 624,181, filed November 23, 1956, now Patent No. 2,930,187.

The housing 10 of the fuel injection apparatus is attached to a wall 22 of a combustion chamber of a rocket engine. One wall of the outer chamber 12 has a plurality of outlets 23 spaced thereabout whereby liquid oxygen is injected into the combustion chamber in a plurality of streams. The liquid fuel is supplied from the inner chamber 11 to the combustion chamber through a plurality of outlets 24 in a wall of the inner chamber. The outlets 24 are arranged in a wall that is substantially at right angles to the wall containing the outlets 23 whereby the streams of liquid fuel enter the combustion chamber at substantially right angles to the streams of liquid oxygen. The openings 23 and 24 are staggered along the walls of their chamber to insure more mixing than would occur if single large outlets were employed.

The flow of liquid fuel from the inner chamber 11 to the combustion chamber is controlled by a valve member 25, which slides along a rod 26 disposed within the inner chamber 11 and supported by the casing 10. Two sets of cooperating springs 27 and 28 urge the valve member 25 to its closed position. A sealing ring 29, which is disposed on an upper surface of the valve member 25, abuts against a flange 30 on the wall of the inner chamber 11 to prevent liquid fuel in the inner chamber 11 from dripping through the outlets 24 into the combustion chamber during shutdown. When the valve 17 in the fuel conduit 16 is open, the pump 14 supplies the liquid fuel under a sufficient pressure to overcome the force of the springs 27 and 28 to move the valve member 25 to its open position whereby the liquid fuel passes through the outlets 24 into the combustion chamber. A sealing ring 31, which is on the lower surface of the valve member 25, abuts against a protruding portion 32 of the housing 10 to prevent any leakage of fuel therebetween.

Considering the operation of the present invention, the pump 14 supplies liquid fuel to the inner chamber 11 to move the valve member 25 to open the outlets 24 to admit liquid fuel in a plurality of streams into the combustion chamber. At substantially the same time, the liquid oxygen is supplied to the outer chamber 12 by the pump 18 whereby the oxygen flows through the outlets 23 in a plurality of streams to mix with the streams of fuel passing through the outlets 24 to produce combustion in the combustion chamber. If the valve 17 stops flow of fuel to the chamber 11, the pressure of the fuel in the chamber 11 drops and the springs 27 and 28 automatically return the valve member 25 rapidly to its closed position to stop flow of liquid fuel through the outlets 24. This prevents dripping of the liquid fuel into the combustion chamber during shutdown and eliminates the possibility of an explosion when the engine is started again due to the large accumulation of liquid fuel that might result if such dripping were not prevented. It will be understood that the openings 23 through which the liquid oxygen passes do not have a control member since the high volatility of the liquid oxygen renders such valve structure inadvisable at this position.

By the use of a plurality of streams, which have a greater surface than that of two sheet streams, the present invention has the advantage of producing a better mixing of the fuel and oxygen to thereby increase the combustion efficiency. Another advantage of this invention is that it meters the fuel and oxygen in the desired ratio. A further advantage of this invention is that it eliminates the danger of explosion when the motor is started since dripping of fuel into the thrust chamber during shutdown is prevented.

For purposes of exemplification, a particular embodiment of the invention has been shown and described according to the best present understanding thereof. How-

We claim:
1. Injection apparatus for injecting liquid fuel and liquid oxygen into a combustion chamber or the like comprising a casing, one end of said casing extending into said combustion chamber, said casing having an outer annular chamber and an inner annular chamber, said outer annular chamber substantially surrounding said inner annular chamber, the major portion of both of said chambers being located within said combustion chamber, said inner annular chamber extending farther into said combustion chamber than said outer annular chamber, said outer annular chamber having a plurality of fixed area openings in one of its walls, the axis of said openings being parallel to the axis of said combustion chamber, a rod, the core of said inner annular chamber being defined by said rod, the axis of said rod being parallel to the axis of said combustion chamber, said inner annular chamber having a plurality of openings in one of its walls, the axis of said latter openings being perpendicular to the axis of said first mentioned openings, means to supply liquid oxygen to said outer annular chamber for continuous free passage through said first mentioned openings directly into said combustion chamber, a valve means comprising a member mounted for slidable movement along said rod and resilient means interposed between said member and said casing to urge said member to a normal position covering said second mentioned openings, means to pressure feed liquid fuel to said inner annular chamber to move said member to a second position uncovering said second mentioned openings to permit unobstructed passage of pressure fed liquid fuel from said inner annular chamber through said second mentioned openings, said valve means being operative to prevent flow of liquid fuel through said second mentioned openings when the fuel pressure in said inner annular chamber drops to a predetermined value.

2. Injection apparatus according to claim 1 wherein said one end of said casing is capped by a vented wall section, said resilient means being interposed between said member and said vented wall section.

References Cited in the file of this patent
UNITED STATES PATENTS

| | | |
|---|---|---|
| 1,786,946 | Hofman | Dec. 30, 1930 |
| 2,405,465 | Summerfield | Aug. 6, 1946 |
| 2,409,036 | Goddard | Oct. 8, 1946 |
| 2,445,856 | Mayer | July 27, 1948 |
| 2,500,334 | Zucrow | Mar. 14, 1950 |
| 2,754,656 | Munger | July 17, 1956 |